United States Patent
Murakowski

[11] Patent Number: 5,997,438
[45] Date of Patent: Dec. 7, 1999

[54] COMBINATION CONTROL FOR VEHICLES

[76] Inventor: Janusz A Murakowski, 17-3A Fairway Rd., Newark, Del. 19711

[21] Appl. No.: 08/703,899

[22] Filed: Aug. 27, 1996

[51] Int. Cl.⁶ .................................................... B60K 41/20
[52] U.S. Cl. ............................................................. 477/213
[58] Field of Search .................................... 477/211, 212, 477/213; 74/478

[56] References Cited

U.S. PATENT DOCUMENTS

| | | |
|---|---|---|
| 1,489,025 | 4/1924 | Davis . |
| 1,503,939 | 8/1924 | Davis . |
| 1,907,009 | 5/1933 | Rockwell . |
| 1,910,412 | 5/1933 | Staude . |
| 2,015,717 | 10/1935 | Hanratty . |
| 2,021,859 | 11/1935 | Jarvis . |
| 2,024,055 | 12/1935 | Moore . |
| 2,042,202 | 5/1936 | Althouse . |
| 2,060,731 | 11/1936 | Harroun . |
| 2,085,550 | 6/1937 | Staude . |
| 2,113,974 | 4/1938 | Arkley . |
| 2,125,952 | 8/1938 | Perry . |
| 2,200,685 | 5/1940 | Anderson . |
| 2,203,777 | 6/1940 | Detmers . |
| 2,244,116 | 6/1941 | Polonec et al. . |
| 2,258,627 | 10/1941 | Siesennop . |
| 2,279,458 | 4/1941 | Harkness . |
| 2,321,614 | 6/1943 | Palmer et al. . |
| 2,332,122 | 10/1943 | Vaughn . |
| 2,411,167 | 11/1946 | Perry . |
| 2,453,054 | 11/1948 | Whiffen . |
| 2,536,854 | 1/1951 | Parker . |
| 2,547,593 | 4/1951 | Morris . |
| 2,627,329 | 2/1953 | Deputy . |
| 2,677,446 | 5/1954 | Hrushow . |
| 2,724,469 | 11/1955 | Bailey . |
| 2,730,214 | 1/1956 | Scott . |
| 2,738,862 | 3/1956 | England . |
| 2,787,352 | 4/1957 | Hoobler . |
| 2,797,302 | 5/1957 | Christopher . |
| 2,856,042 | 10/1958 | England . |
| 2,936,867 | 5/1960 | Perry . |
| 3,359,821 | 12/1967 | Beardsley . |
| 3,635,316 | 1/1972 | Rogers . |
| 4,237,752 | 12/1980 | Hilderbrecht . |

*Primary Examiner*—Dirk Wright

[57] ABSTRACT

A simple foot operated mechanism for controlling both throttle and brakes of a motor vehicle is disclosed. The throttle is controlled by pivoting foot at the ankle. A locking mechanism is used, which provides rigid support for the driver's foot while operating the throttle. The brakes are applied by pushing the heel down to release the locking mechanism, and straightening the knee. The leg movement from accelerating to braking is a natural and smooth one, and in a natural way cuts the fuel to the engine before brakes are applied. Once brakes are applied it is possible to open the throttle valve without necessarily releasing brakes.

20 Claims, 10 Drawing Sheets

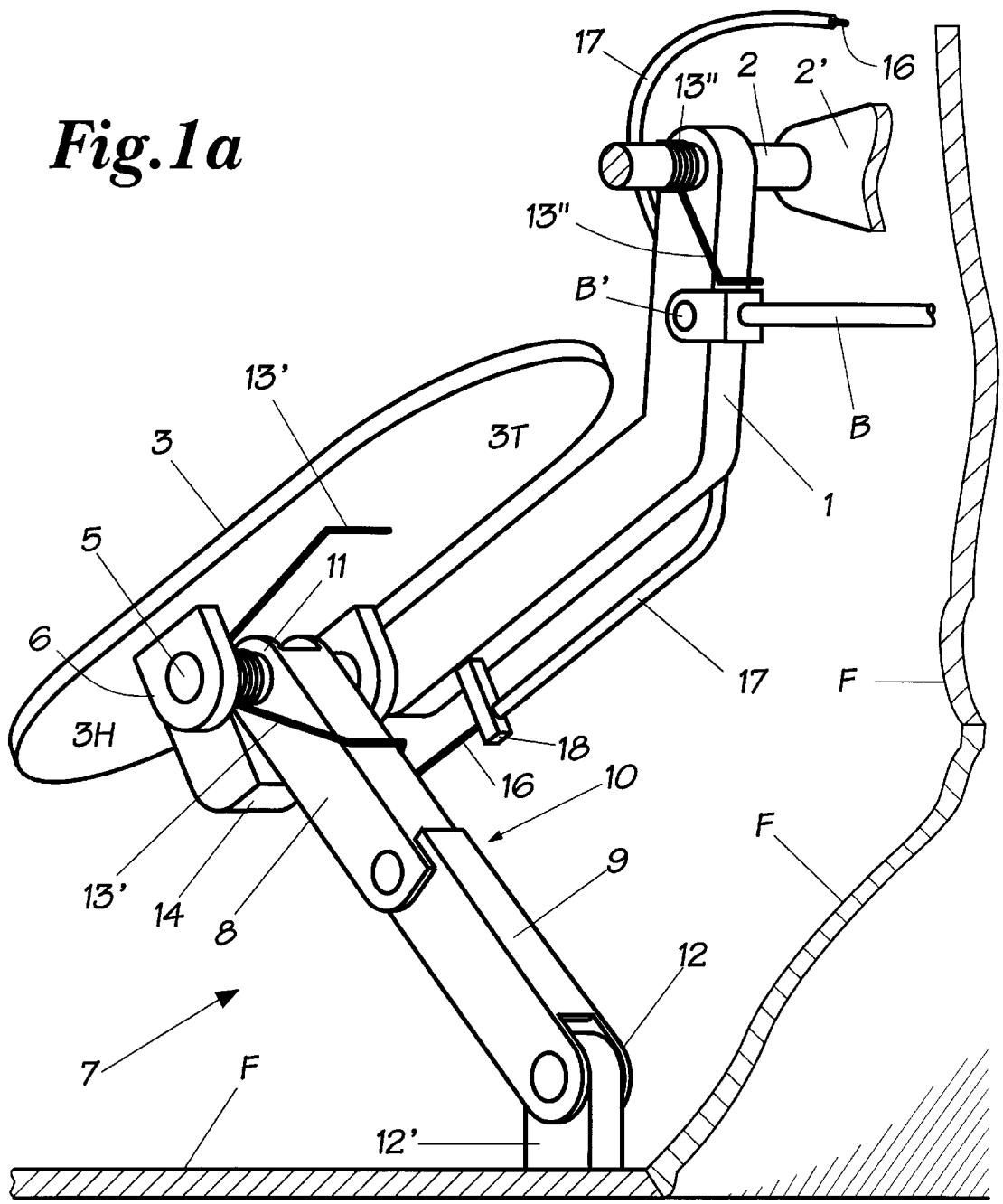

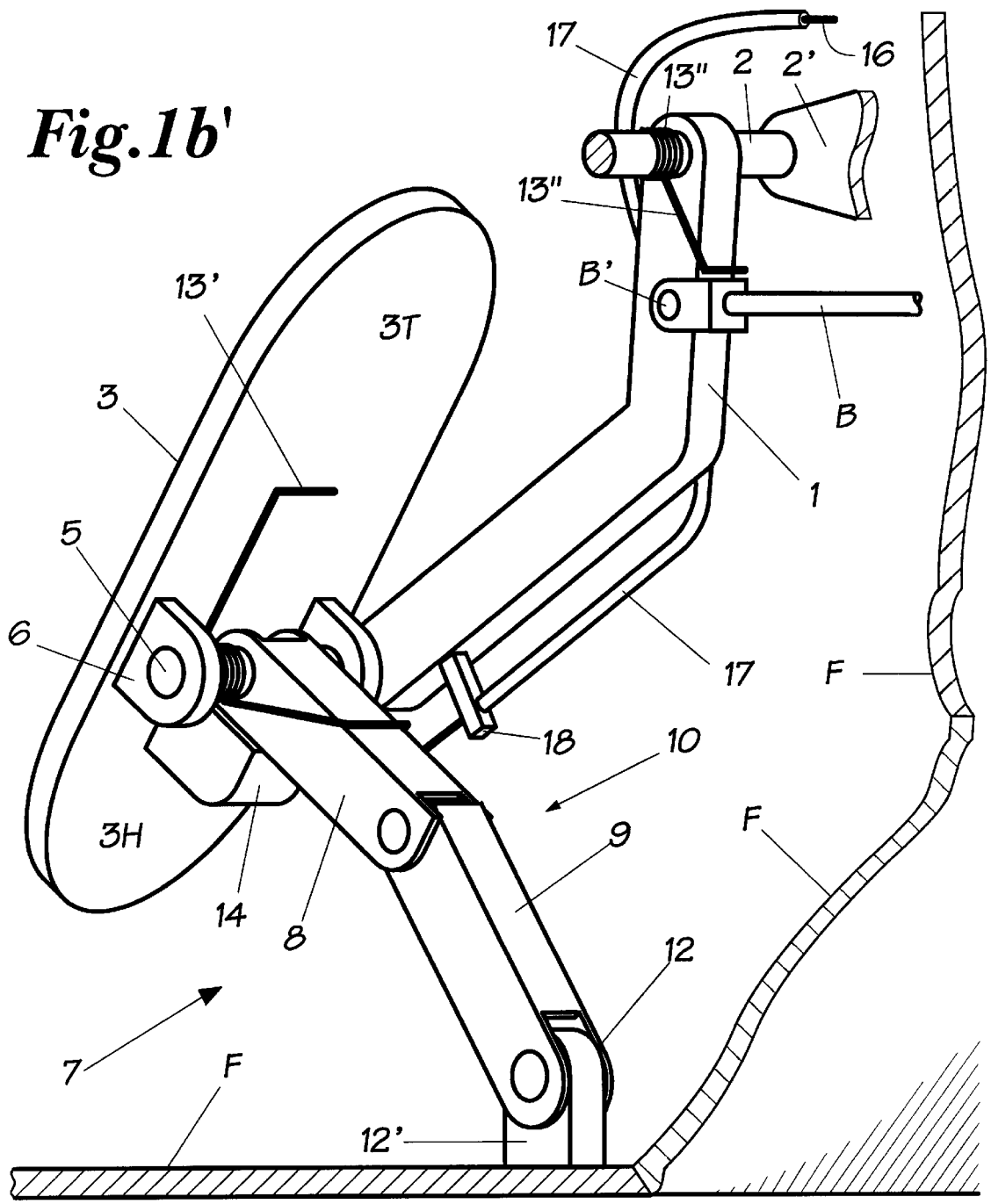

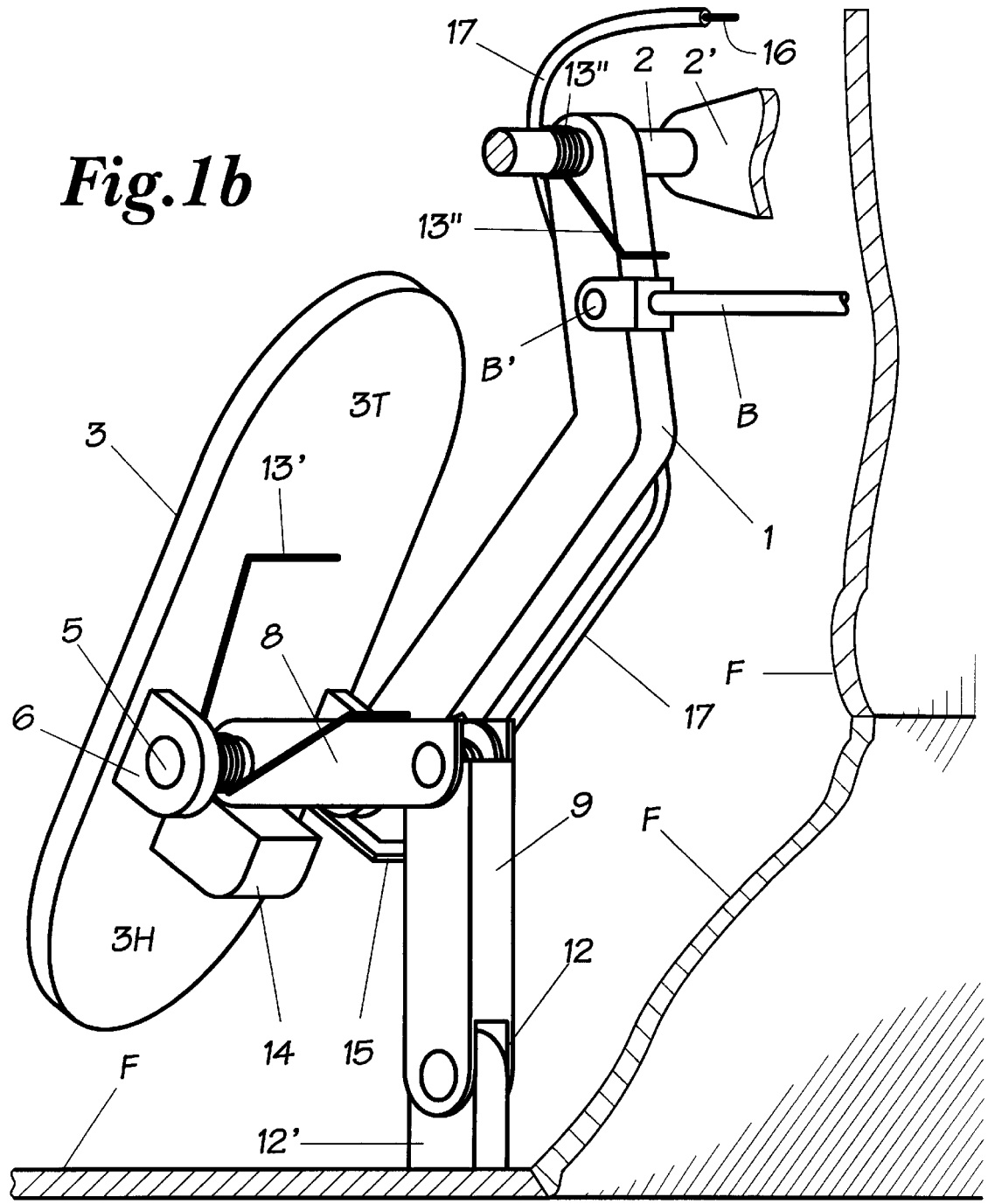

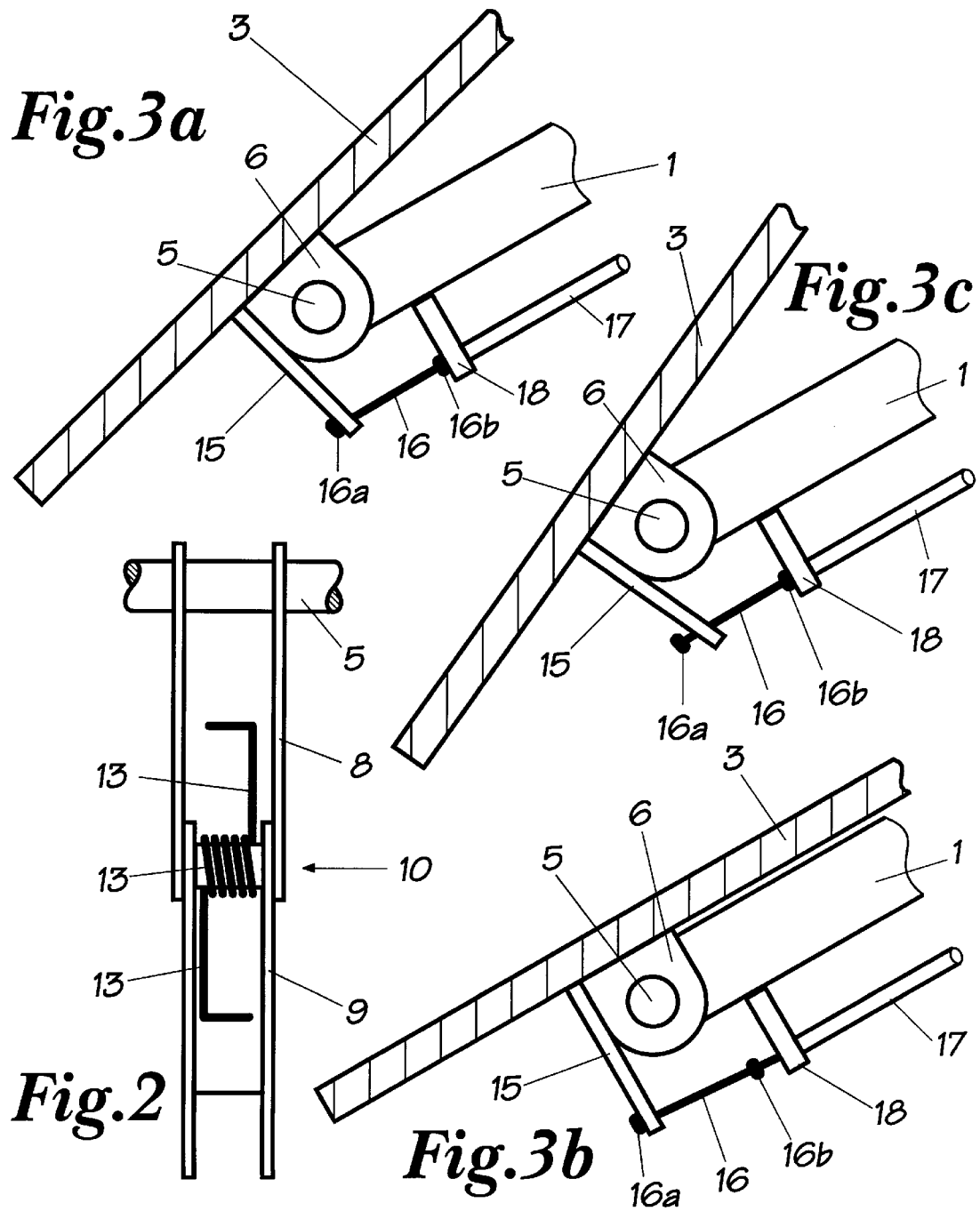

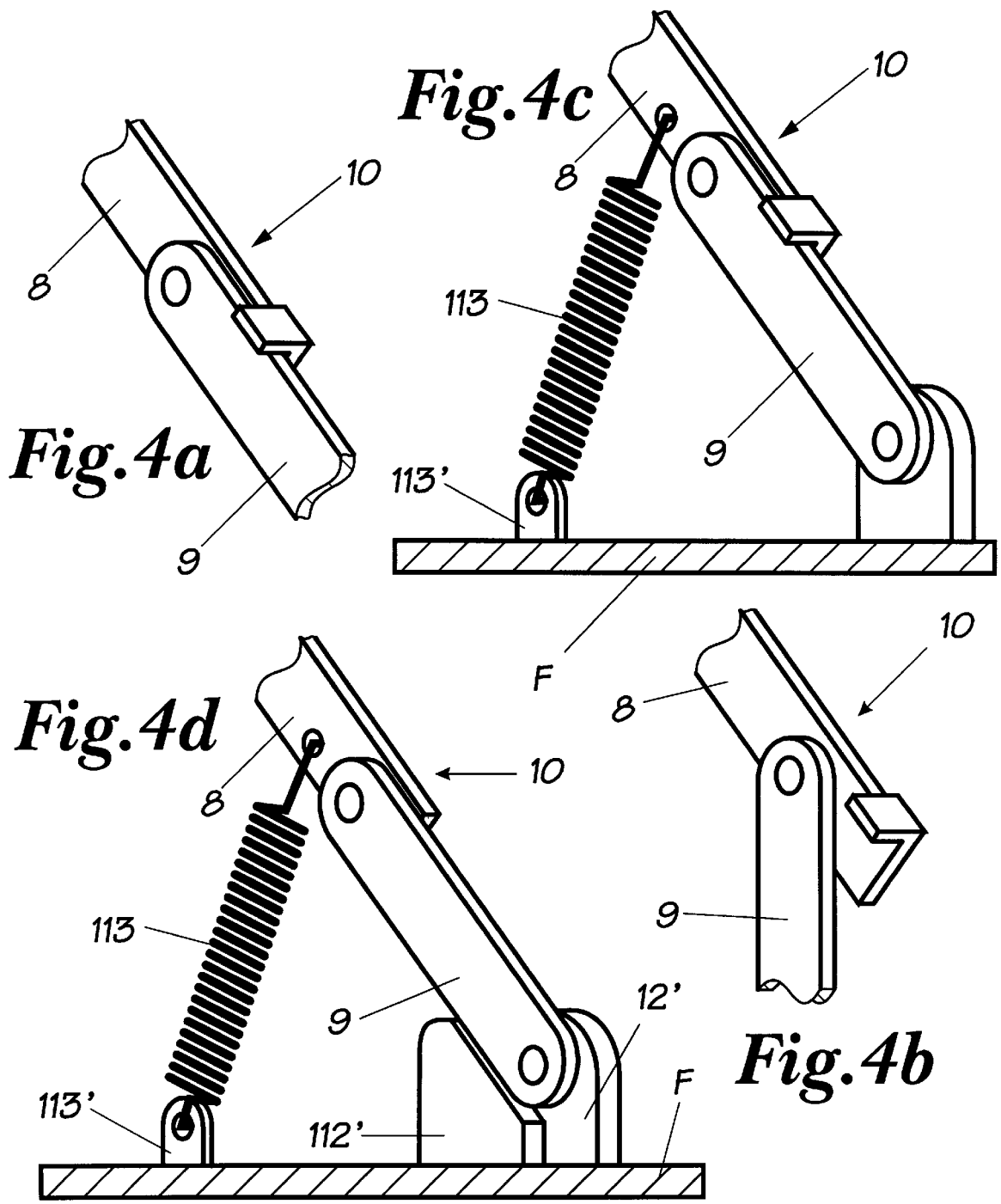

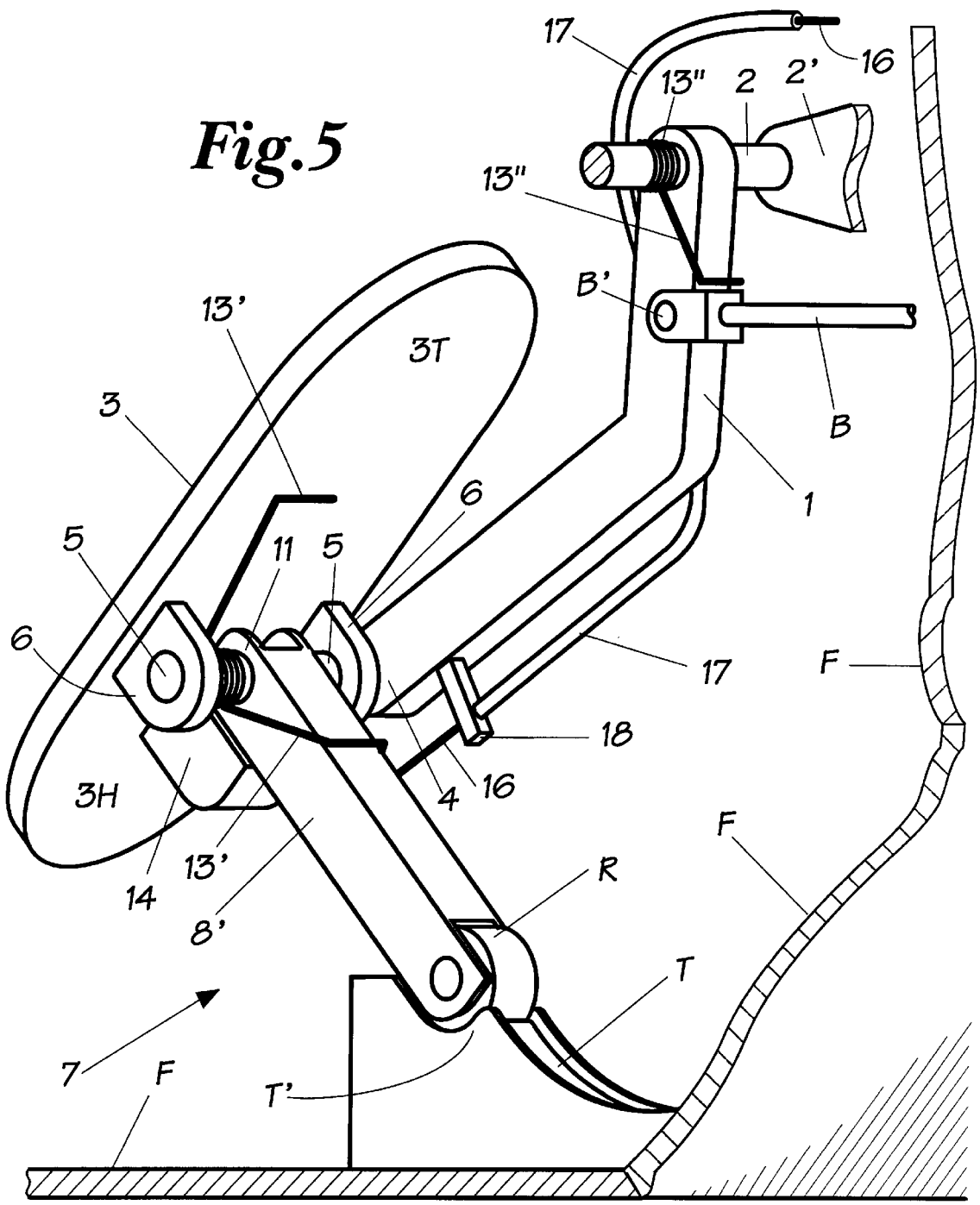

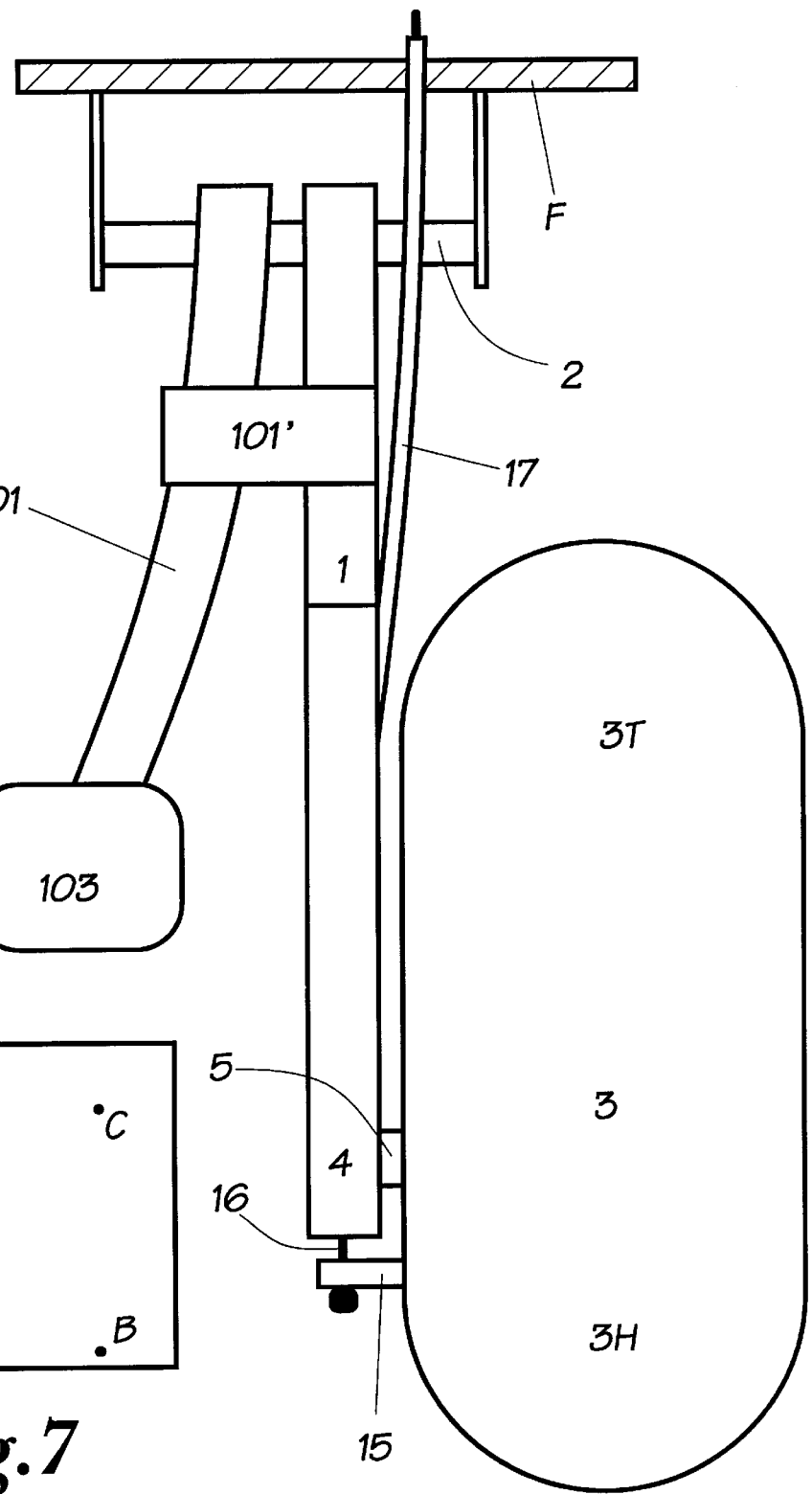

COMBINATION CONTROL FOR VEHICLES

BACKGROUND

1. Field of Invention

The present invention relates to a combined foot operated mechanism for controlling the acceleration and braking of a motor vehicle with a single control element.

2. Discussion of Prior Art

The advantages of a single controlling element for both accelerating and braking are numerous and have been recognized and appreciated by many inventors since the dawn of motor industry. The most important advantage of a single-pedal control over the conventional two-pedal control is that the driver's foot travels shorter distance when transition from accelerating to braking is desired. As a result less time is needed to start braking after a period of accelerating or maintaining constant speed by means for fueling the engine. Consequently, in case of emergency the time from perception of emergency to engaging vehicle brakes is reduced whereby increasing chances of avoiding an accident or lessening its severity.

Despite great effort none of the prior art has found its way to widespread use mainly because potential advantages of a single controlling element have been overweighed by inherent disadvantages of the proposed mechanisms.

The prior art search has revealed dozens of inventions combining the functions of accelerator and brakes in a single controlling element. Only those which are closest in operational characteristics to my combination control will be analysed here. They are divided into several classes according to the disadvantages they are flawed with. Some of them fit into more than one class; these were included in the class in which the particular drawback is most prominent.

| Class 1 | | |
|---|---|---|
| Pat. # | Granted on | Inventor(s) |
| 1,910,412 | May 23, 1929 | Edwin G. Staude |
| 2,113,974 | April 12, 1938 | William Arkley |
| 2,200,685 | May 14, 1940 | Stanley E. Anderson |
| 2,279,458 | April 14, 1941 | Jack C. Harkness |
| 2,332,122 | October 19, 1943 | Isaac Newtown Vaughn |
| 2,453,054 | November 2, 1948 | Richard Eldridge Whiffen |
| 2,547,593 | April 3, 1951 | Paul C. Morris |
| 2,627,329 | February 3, 1953 | Marshall P. Deputy |
| 2,724,469 | November 22, 1955 | William A Bailey |
| 3,635,316 | January 18, 1972 | Henry C. Rogers and Fanny L. Rogers |

In all of the above inventions the operator's foot is supported by a spring or other resilient means during normal driving, i.e. when the accelerator is applied. To apply brakes, the driver has to act against the supporting spring tension. The supporting spring has to be strong enough to support a foot of even the heaviest driver, so that he/she does not 'ride' brakes during normal driving. Potential advantages of a single control elements are overweighed by a substantially greater effort required from the driver to apply brakes.

| Class 2 | | |
|---|---|---|
| Pat.# | Granted on | Inventor(s) |
| 2,024,055 | December 10, 1935 | Robert P. Moore |
| 2,085,550 | June 29, 1937 | Edwin G. Staude |
| 2,203,777 | June 11, 1940 | Fred E Detmers |
| 2,321,614 | June 15, 1943 | Clinton D. Palmer, William N. Lowe |
| 2,730,214 | January 10, 1956 | Pauline F. Scott |

In these inventions the operator's foot is supported by a yieldable lock during normal driving. Once the initial resistance is overcome the driver no longer has to maintain great pressure on the pedal to keep the brakes applied. The initial resistance of the yieldable lock has to be strong enough to support a foot of even the heaviest driver which makes it hard for a weak driver to apply brakes. Additionally this solution makes it difficult to apply brakes gently—you have to hit the pedal hard to overcome the initial resistance of the yieldable lock. Moreover, they do not prevent applying brakes when the throttle valve is open. Consequently, in an emergency the driver may have the throttle fully open while applying brakes, whereby diminishing the effectiveness of braking.

| Class 3 | | |
|---|---|---|
| Pat.# | Granted on | Inventor(s) |
| 1,907,009 | May 2, 1933 | Edward A. Rockwell |
| 2,021,859 | November 19, 1935 | Franklin W. Jarvis |
| 2,042,202 | May 26, 1936 | Arthur B. Althouse |
| 2,258,627 | April 13, 1940 | John L. Siesennop |
| 2,411,167 | November 19, 1946 | Nelson I. Perry |
| 2,738,862 | March 20 1956 | Kenneth W. England |
| 2,856,042 | October 14, 1958 | Kenneth W. England |
| 2,936,867 | May 17, 1960 | nelson I. Perry |

In these inventions it is not possible to open throttle valve when brakes are applied, which makes it hard to start the vehicle uphill without the use of an additional (hand) brake. Also, the inventions in this class are complicated, whereby inherently less reliable and more expensive to manufacture than for example the standard two pedal solution.

| Class 4 | | |
|---|---|---|
| Pat.# | Granted on | Inventor(s) |
| 1,489,025 | April 1, 1924 | William Davis |
| 1,503,939 | August 5, 1924 | William Davis |
| 2,125,952 | August 9, 1938 | Nelson I. Perry |
| 2,244,116 | June 3, 1941 | Lubo Polonec and Anders K. Andersen |
| 2,536,854 | January 2 1951 | Lester J. Parker |
| 2,787,352 | April 2, 1957 | Ernest S. Hoobler |
| 2,791,302 | May 7, 1957 | Noel Albert Christopher |
| 4,237,752 | December 9, 1980 | Herold V. Hilderbrecht |

In these inventions some slidable movement of the pedal is required to actuate different mechanisms, hence the pressure of the driver's foot against the control member is not always perpendicular to the surface engaged by the driver's foot whereby promoting slippage of the driver's foot off the pedal.

The following patents do not seem to fit any of the above classes.

The invention of U.S. Pat. No. 2,677,446 granted on May 4, 1954 to W. K. Hrushow is prohibitedly complex.

The size of the invention of U.S. Pat. No. 3,359,821 granted on Dec. 26, 1967 to R. G Beardsley et. al. makes it unsuitable for automobiles. Also it is relatively complex.

In the invention of U.S. Pat. No. 2,060,731 granted on Nov. 10, 1936 to R. Harroun the pedal travels a very short distance for brakes actuation. This feature renders the invention useless for brakes which are not power assisted as they would require too strong pressure applied to the pedal to brake effectively. Moreover the fine movement of the pedal for brake actuation requires that the driver fine-tune his/her actions to obtain the desired braking power.

Another interesting mechanism is disclosed in U.S. Pat. No. 2,015,,717 granted on Oct. 1, 1935 to Arthur D. Hanratty. There are, however, certain features of this device which act to its disadvantage. These include:

Change in brake lever position does affect the throttle.

To effectively operate the throttle when brakes are applied and at the same time to be able to release brakes easily, it is necessary to press gas fully first.

It is possible to get the pedal stuck in the braking position by slightly opening the throttle when braking.

The device is rather complex, with many moving parts; it employs a rack and pawl mechanism, which is known to require frequent lubrication.

OBJECTS AND ADVANTAGES

Accordingly, the primary object of the present invention is to provide a simple combined throttle and brake controlling mechanism in which the motion of the driver's foot to actuate throttle is identical to the motion involved in a conventional automobile, and the motion of the driver's leg to apply brakes is similar to a natural emergency reflex; the movement of the driver's foot from accelerating to braking is a natural and smooth one and in a natural way cuts fuel to the engine.

Another object is to allow for simultaneous application of brakes and accelerator, provided that the brakes are actuated first, whereby allowing for a relatively easy start of a vehicle uphill without the use of an emergency, or hand brake.

Another object is to provide rigid support for the driver's foot during normal driving when accelerator is applied, whereby reducing strain to the driver's leg and preventing 'riding' the brakes.

Another object is to arrange the control mechanism, so that the pressure of the driver's foot against the control member is always substantially perpendicular to the surface engaged by the operator's foot, whereby minimizing the chance of the driver's foot slipping off the pedal.

Other objects and advantages will become apparent in the following specification when considered in light of the attached drawings.

BRIEF DESCRIPTION OF THE DRAWINGS

FIG. 2 is a rear view of the locking mechanism of my combination control, showing a spring which is obscured in FIG. 1.

FIG. 3a is a sectional view of FIG. 3 taken along line 3a.

FIGS. 3b and 3c are views similar to that of FIG. 3a with parts in positions corresponding to these from FIG. 1a and FIG. 1b' respectively.

FIGS. 4a to 4d show various minor modifications of a portion of my combination control.

FIG. 5 is a perspective view similar to the one of FIG. 1 of a modification of my combination control.

FIG. 6 is a top view of another modification of my combination control.

FIG. 7 presents configuration space of my combination control.

SUMMARY

The idea of this combination control is to provide a mechanism with a single control element for controlling automobile acceleration by pivoting an ankle and braking by pushing the entire foot down. A locking mechanism is used which, in a locked position, lets the driver rest his/her foot on the control element while operating the throttle. The locking mechanism is released for braking by pushing heel down. While pushing heel down to release the locking mechanism and engage brakes, the driver automatically cuts fuel to the engine. While brakes are applied, it is possible to fuel the engineer by pivoting the ankle.

Figure 1:
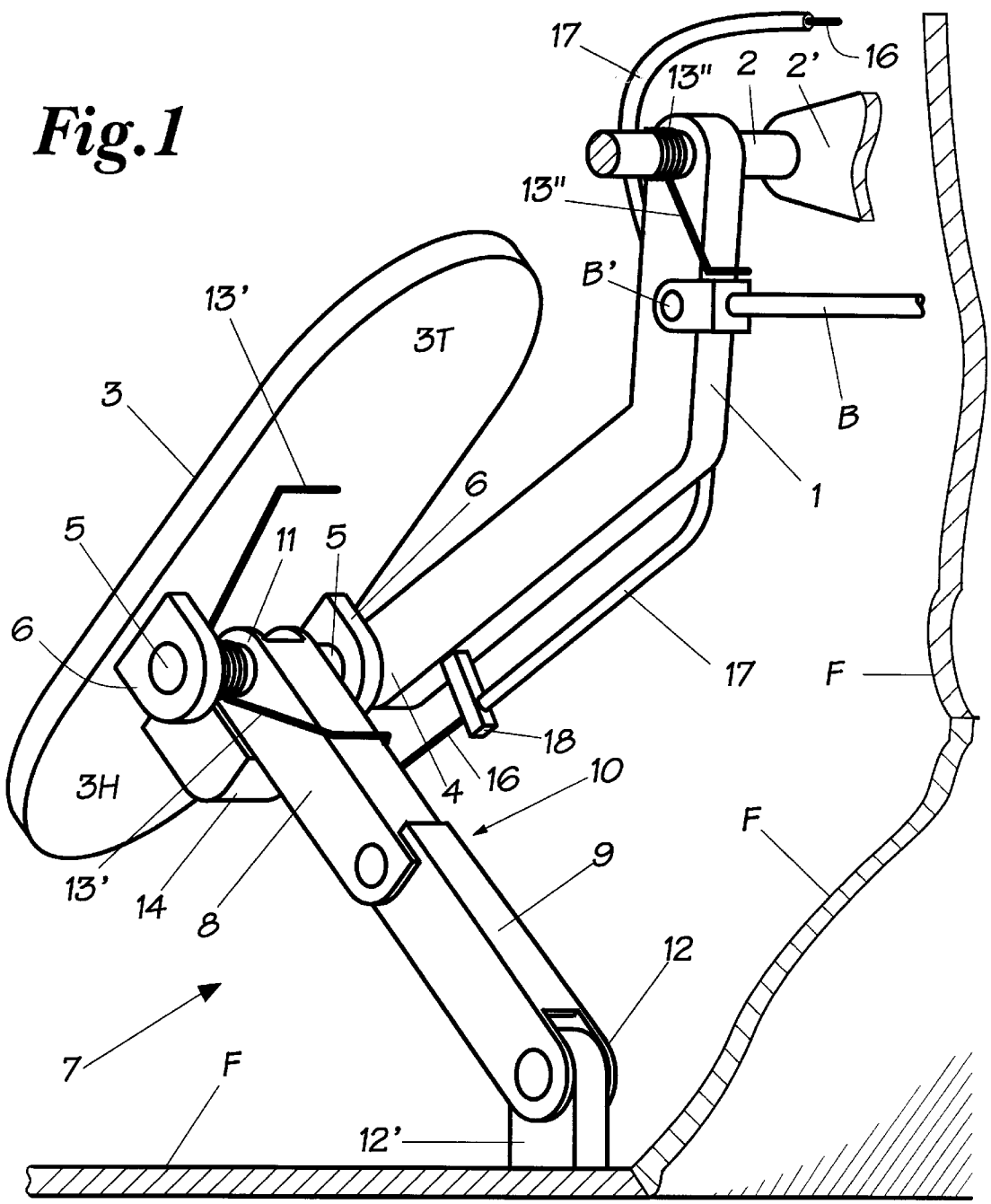
FIG. 1 is a perspective view of my combination control looked upon from front right.
Figure 3:
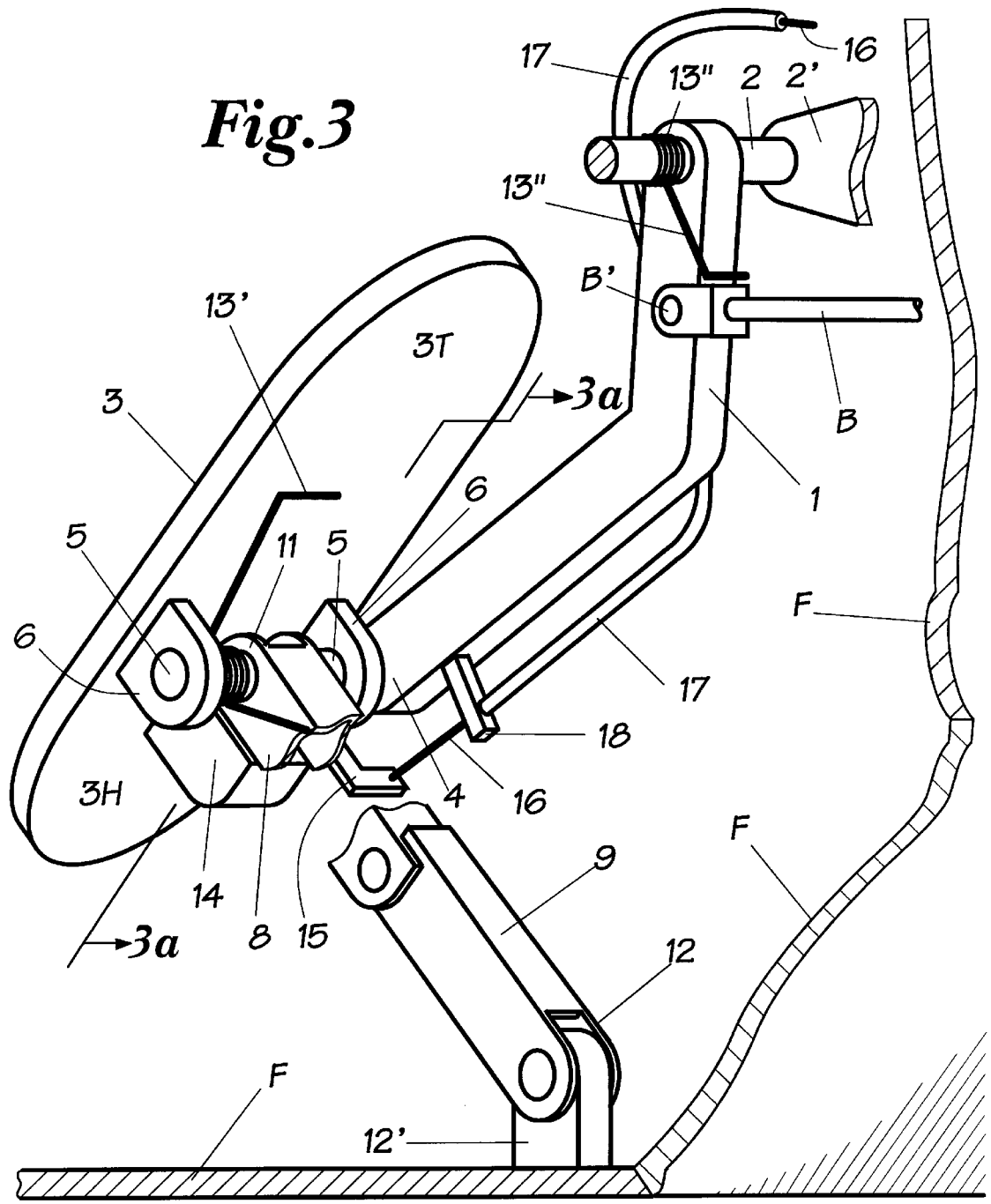
FIG. 3 is a view similar to that of FIG. 1 with some parts broken away to show elements behind them.

Description of Preferred Embodiment of Combination Control—FIGS. 1 to 3

FIG. 1 shows schematically a perspective view of a basic version of my combination control with elements in a position corresponding to a closed throttle valve and released brakes; part of the vehicle floor is broken away. A usual brake lever 1 is fulcrumed on a pivot 2 which is conventionally attached at 2' to the vehicle. At the other end of lever 1, at 4, there is a shaft 5 projecting sideways or perpendicularly to the vehicle axis. A foot piece, or a control member 3 is pivoted on shaft 5 via ears 6 attached to the underside of foot piece 3. Toe an heel portions of foot piece 3 are denoted as 3T and 3H respectively. In the position shown in FIG. 1, the axis of rotation of lever 1 on pivot 2 lies approximately in a plane defined by the upper surface of foot piece 3.

A locking mechanism 7 comprises rods 8 and 9 pivotally joined at 10. Rod 8 of locking mechanism 7 is pivoted on shaft 5 as at 11. Rod 9 of locking mechanism 7 is at its lower end pivotally attached at 12 to a lug 12', which is bolted or otherwise secured to a vehicle floor F. Joint 10 between rods 8 and 9 is so arranged, that it can bend forward like in FIGS. 1b' and 1b, but cannot bend backward, similarly to a human knee joint. A pusher 14 is secured to the underside of foot piece 3 somewhat behind shaft 5.

A coil torsion spring 13, see FIG. 2, is secured to joint 10 with one arm pushing against rod 8 and the other arm pushing against rod 9; it urges joining 10 to a straightened position. A coil torsion spring 13' is put on shaft 5 with one of its arms pushing against foot piece 3 and the other arm pushing against rod 8; it urges toe portion 3T of foot piece 3 up. A conventional coil torsion spring 13" urges brake lever 1 up. Only one arm of coil spring 13" is shown.

A Bowden cable 17 is guided along lever 1. An inner wire 16 of Bowden cable 17 is at its lower end passed through a hole in an arm 15, see FIG. 3, which is secured to the underside of foot piece 3. Abutments 16a and 16b are fixed to inner wire 16 at its lower end, see FIG. 3a. Abutment 16a is engagable by rear surface of arm 15. Abutment 16b is engagable by rear surface of an arm 18 projecting down from lever 1. The other end of wire 16 is attached to a member controlling a carburetor throttle (not shown). The shell of Bowden cable 17 is at its lower end secured to arm 18. The other end of the shell of the Bowden cable is secured in any conventional manner to a fixed part of the carburetor (not shown). This arrangement of the Bowden cable transfers the relative movement of foot piece 3 with respect to lever 1 to the movement of the throttle valve, regardless of the position of lever 1 on pivot 2. It is understood that the throttle valve is being opened when toe portions 3T of foot piece 3 is going down. FIG. 1 shows the mechanism in a position corresponding to the throttle closed.

A rod B controlling vehicles brakes (not shown) is pivotally attached to lever 1 at B'.

Operation

The mechanism works as follows: When there is no pressure on foot piece 3, the mechanism assumes a position as shown in FIG. 1 due to the action of springs 13, 13' and 13". The driver places his/her foot on foot piece 3. Lever 1 will not go down even under high pressure on foot piece 3 as long as foot piece 3 is not pivoted on shaft 5 because it is supported by locking mechanism 7, joint 10 being in a straightened position. When it is desired to accelerate the vehicle, the driver pivots his/her foot at the ankle clockwise, so as to move toe portion 3T of foot piece 3 down or away from his/her body, see FIG. 1a. Arm 15 (FIGS. 3 and 3b) engages abutment 16a and pulls inner wire 16 which opens the throttle valve (not shown), whereby accelerating the vehicle. Abutment 16b disengages from arm 18. Pusher 14 disengages from rod 8 (FIG. 1a) and joining 10 is kept in a locked or straightened position by springs 13 and 13'.

When it is desired to brake, the operator pushes heel portion 3H of foot piece 3 letting his/her foot pivot at the ankle anticlockwise so as to move toe portion 3T of foot piece 3 up. At some point of this pivotal movement pusher 14 engages rod 8, see FIG. 1. Further movement of foot piece 3 in this direction will make pusher 14 push rod 8 forward, whereby forcing joint 10 to bend forward, see FIG. 1b'. Abutment 16a disengages from arm 15 and abutment 16b engages arm 18, see FIG. 3c, so that the movement from the position of FIG. 1 to that of FIG. 1b' has no effect on the throttle valve: it is closed throughout this movement. Once joint 10 is bent, locking mechanism 7 no longer provides rigid support for foot piece 3 and lever 1. By straightening his/her knee, the operator will force lever 1 to go down, see FIG. 1b, whereby engaging brakes via rod B.

Figure 1C:
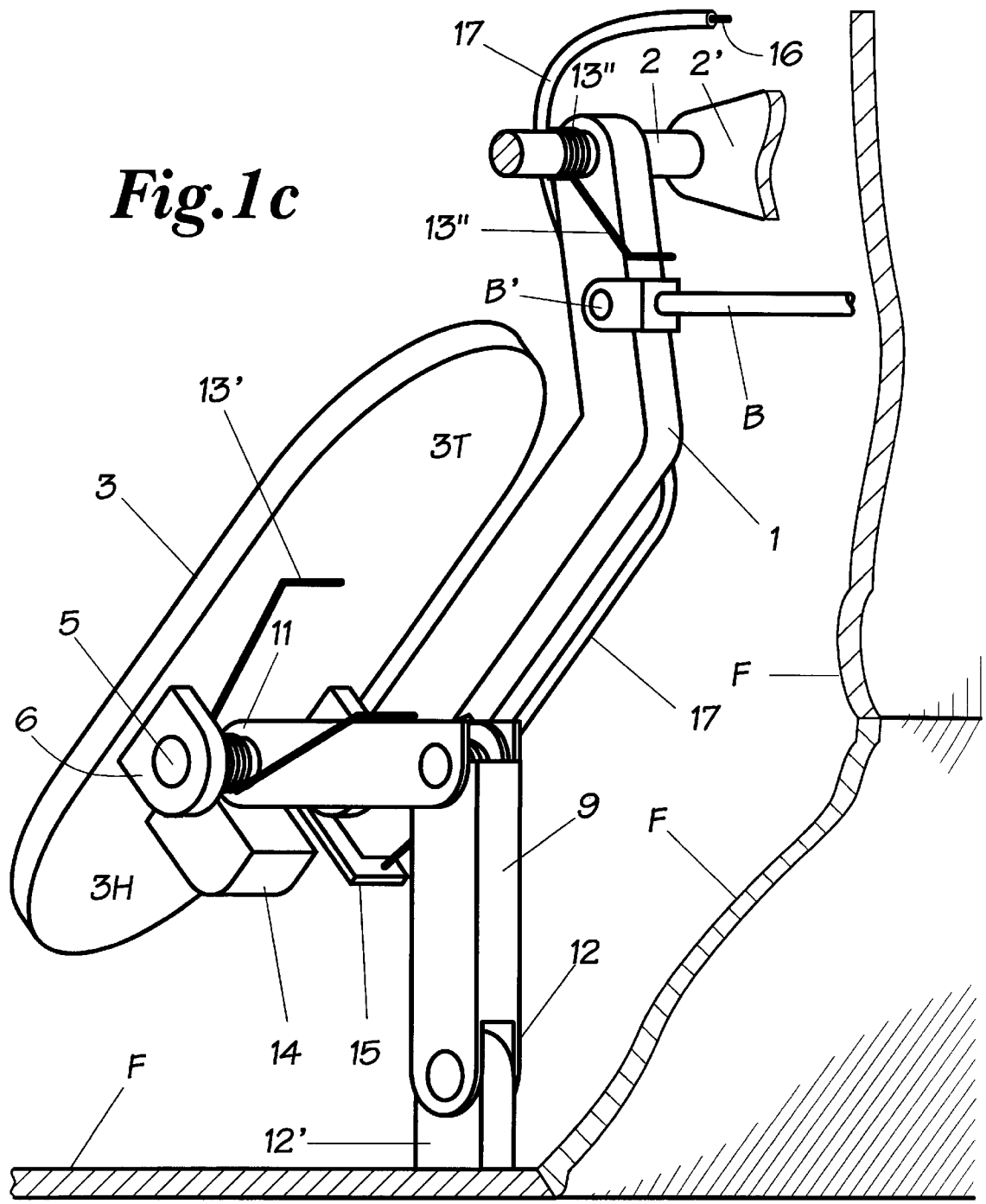
FIGS. 1a, 1b', 1b, 1c show my combination control in various operating positions.

When brake lever 1 is down, i.e. brakes are applied, the operator is free to pivot his/her ankle clockwise whereby fueling the engine, see FIG. 1c. This feature is important when the vehicle is to be started uphill, in which case the driver would apply brakes by pushing the heel down and straightening his/her knee, FIGS. 1b' and 1b, then fuel the engine by pivoting his/her ankle clockwise, FIG. 1c, and then release brakes along with the clutch pedal. On the other hand to apply the brakes when lever 1 is up it is necessary for the driver to first cut the fuel to the engine by pivoting foot piece 3 counterclockwise and then straightening his/her knee. Thanks to the fact that the axis of rotation of pivot 2 is lying approximately in the plane defined by the upper surface of foot piece 3 when locking mechanism 7 is just about to be released, FIG. 1, the last movement is a natural and smooth one with the foot pressure on foot piece 3 always substantially perpendicular to the surface engaged by the operator's foot; the trajectory swept by a point at 3H portion of foot piece 3 is a smooth curve. These features reduce the chance of the foot slipping off the pedal and relieve the driver from consciously deciding what action to undertake to slow down the vehicle—pushing heels down to stop is a natural reflex.

Modifications of Preferred Embodiment—
FIGS. 4a to 4d

The previous two sections describe the preferred embodiment and operation of my combination control. For those skilled in art it is clear that certain modifications can be made in it without changing its functionality. FIGS. 4a to 4d show examples of possible minor modifications. Specifically, FIG. 4a presents a modification of joint 10 between rods 8 and 9 of locking mechanism 7. It has exactly the same property as joint 10 from FIG. 1 that it can bend forward, as presented at FIG. 4b, but cannot bend backward. Other types of joints with this property are well known to those skilled in art and can be found in appropriate literature.

In case of joint 10 from FIGS. 4a and 4b it would be awkward to connect a torsion spring analogous to spring 13. Therefore for urging joint 10 to a straighten position a spring 113 is used as in FIG. 4c. Spring 113 is at its lower end attached to a lug 113' secured to the vehicle floor, and at its upper end spring 113 is attached to rod 8 at a point adjacent to joint 10. It urges joining 10 down or equivalently to a straightened position.

FIG. 4d presents an alternative solution to preventing joining 10 from bending backward. In this case joint 10 is a regular pivotal connection allowed to bend both forward and backward when it stands along. A support 112' is formed as a part of lug 12'. Support 112' prevents rod 19 from turning anticlockwise beyond a point corresponding to joint 10 being in a straightened position. In this case the functional behavior of parts 8, 9 and joining 10 is exactly the same as above: joint 10 cannot bend backward. Spring 113 is connected in a similar fashion as in FIG. 4c and has the same function as there.

The operation of my combination control with the modifications discussed in this section is precisely the same as the operation of the preferred embodiment, except that spring 13 is replaced by 113.

Description of Modification of Combination
Control—FIG. 5

FIG. 5 presents a modification of the invention. The difference lies in the locking mechanism which now comprises a rod 8' hinged upon shaft 5 and terminated at the other end with a roller R. A track T engagable by roller R is mounted on the vehicle floor. Track T has a portion T', which is perpendicular to rod 8' when there is no pressure applied to foot piece 3.

Operation of Modification of Combination
Control—FIG. 5

If toe portion 3T of foot piece 3 is depressed, pusher 14 will disengage from rod 8' and roller R will stay on portion T' of track T whereby providing rigid support for the driver's foot while actuating the throttle valve. For braking, the driver pivots foot piece 3 anticlockwise causing pusher 14 push rod 8' forward and roller R off portion T' of track T. Once roller R is off portion T' of track T, rod 8' will no longer provide support for foot piece 3 and lever 1. By depressing foot piece 3, the driver will not be able to engage brakes. When the brakes are applied (roller R is off portion T' of track T) the driver is free to pivot foot piece 3 clockwise, whereby fueling the engine.

Modification of Preferred Embodiment—FIG. 6

Although my combination control is functionally superior to the standard two pedal solution, it can happen that a person unfamiliar with it will have to operate a vehicle equipped with it. To make the transition from the standard two-pedal control to my combination control easy on drivers, a modification of my combination control is proposed. This modification is presented in FIG. 6. In this figure 101 is a regular brake lever fulcrumed on pivot 2 with a brake pedal 103. An arm 101' project sideways from lever 1 and engages lever 101 from the top. As compared to the preferred embodiment presented in FIG. 1, rod B is NOT connected to lever 1, but rather to lever 101 in a standard way.

A clutch pedal is omitted for simplicity.

Operation of Modification of Preferred Embodiment—FIG. 6

There are two modes of operation of the modification presented in FIG. 6. Once mode is similar to the standard two pedal solution. Foot piece 3 is used as an accelerator pedal; throttle valve is opened by pivoting foot piece 3 on shaft 5 so that toe portion 3T goes down and arm 15 pulls wire 16 of Bowden cable 17 and opens throttle valve. In order to brake, the driver transfers his/her foot from foot piece 3 to pedal 103 and depresses it causing lever 101 to go down whereby engaging brakes. When lever 101 goes down, arm 101' disengages from it, so that the movement of lever 101 has no effect on lever 1.

The other mode of operation goes as follows: acceleration is accomplished as above. To brake, the driver pivots foot piece 3 so that toe portion 3T goes up. At some point of this movement locking mechanism 7, described in previous sections, is released and lever 1 is free to go down. The driver depresses foot piece 3 causing lever 1 to go down. As lever 1 goes down so does arm 101'. Arm 101' now engaged with lever 101 pushes it down whereby engaging brakes.

Summary, Ramifications, and Scope

Accordingly, the reader will see that the combination control of this invention is simple, thus reliable and inexpensive to manufacture mechanism allowing for controlling the speed of a motor driver vehicle with a single control element. In addition to the most obvious advantage of a single control element, which is the reduction of time necessary to engage brakes in case of an emergency, my combination control has additional advantages in that the motion of driver'foot to actuate throttle is identical to the motion involved in a conventional automobile, and the motion of the driver's leg to apply brakes is similar to a natural emergency reflex;

the movement of the driver's foot from accelerating to braking is a natural and smooth one and in a natural way cuts fuel to the engine;

it allows to fuel the engine while brakes are applied, whereby allowing for a relatively easy start of a vehicle uphill;

it provides rigid support for the driver's foot while fueling the engine, whereby reducing strain to the driver's leg and preventing 'riding ' brakes;

it allows for the pressure of the driver's foot against the surface of the control element to be always substantially perpendicular to that surface, whereby minimizing the chance of the driver's foot slipping off the pedal;

it requires little change in the structure of a vehicle to replace the existing two pedal control at a manufacturing plant.

Although the description above contains many specificities, these should not be construed as limiting the scope of the invention but as merely providing illustrations of some of the presenting preferred embodiments of this invention. For example the Bowden cable may be replaced by another suitable linkage mechanism or a piece of electronics having the property that it transfers the relative movement of foot piece 3 and lever 1 to the movement of a member controlling the throttle regardless of the position of lever 1 on pivot 2. Also, the locking mechanism which provides rigid support for the driver's foot while operating throttle can assume various forms; for example it can be arranged around pivot 2 rather than 5, with the linkage mentioned above or a separate one actuating it; or it can take a form similar to that presented in FIG. 5 but with a track attached to the underside of foot piece 3, roller R at the top of rod 8', and rod 8' hingably attached at the bottom to the vehicle floor. The pusher, rather than being secured to the foot piece, can be attached to or form a part of rod 8; it can assume various physical shapes. Rod 8 or 8' can be pivotally attached either to lever 1 or foot piece 3 rather than hinged upon shaft 5, which is shared with the pivotal connection between lever 1 and foot piece 3. Also brake lever 1 does not have to be hung at its upper end but can be pivoted at the bottom, or can be slidably mounted in the vehicle floor, etc. Also, the combination control can be sued to control various machines as long as the desired characteristics of operation coincide with the characteristics of my combination control.

Thus the scope of the invention should be determined by the appended claims and their legal equivalents, rather than by the examples given.

Basic Definitions

To put the combination control in a broader context of control mechanisms, it has been found, that some general definitions related to mechanical systems should be given, so that they can be used in the appended claims.

The number of degrees of freedom of a given system is the number of possible independent types of movements the system can do. For example a point particle in 3 dimensional space has three degrees of freedom—it can move in three special directions. Two particles in 3 dimensional space have six degrees of freedom—each of the particles can move independently in three special directions, hence 3+3=6. If the two particles were joined by a stiff rod, then this system would have 6−1=5 degrees of freedom, where the −1 is because one degree of freedom, the distance between the particles, is taken away by introducing a stiff rod. In general, introduction of constraints reduces the number of degrees of freedom.

A rigid body in three dimensional space has six degrees of freedom—it can move in three special directions and also it can rotate around three independent axes, 3+3=6. A gear with a fixed axis of rotation has one degree of freedom. Etc.

According to the above definition, the combination control is a system with two degrees of freedom. The two possible independent movements can be defined as: rotation around pivot 2 and rotation around pivot 5.

The set (collection) of all possible positions or configurations that the system can be found in is called configuration space. The dimension of a configuration space is equal to the number of degrees of freedom. If we limit ourselves to consider only certain types of possible movements, or certain configurations of the system, we call the set of considered configurations a configuration subspace. Clearly the dimension of configuration subspace is less or equal the dimension of the configuration space of a given system.

A boundary of a configuration space can be through of as those configurations, from which the system can go in one direction of some degrees of freedom but not in the other direction. For example, if out system is a point particle in a box, then the inside of the box is the configuration space and the inner surface of the box would constitute a boundary of the configuration space. Incidentally, the boundary of a configuration space is an example of a configuration subspace.

The configuration space of the combination control can be graphically represented by a rectangle, see FIG. 7. Rotation around pivot 2 is represented by movement along a horizontal side, while rotation around pivot 5 is represented by movement along a vertical side. Point O in FIG. 7 corresponds to the position of the combination control depicted in FIG. 1; point B' corresponds to the position of FIG. 1b'; point B corresponds to the positions of FIG. 1b; point C corresponds to the position of FIG. 1c; point A corresponds to the position of FIG. 1a. The edge of the rectangle represents a boundary of the configuration space of the combination control. Adjacent to a portion of the left vertical edge is a row of black triangles. The triangles signify the fact that it is possible to reach the boundary from the right, but it is not possible to leave the boundary by going directly to the right. Or in other words, it is assumed that it is possible to cross the line of triangles from right to left but not from left to right (compare the diode symbol in electronics). The only way to leave the boundary marked with these black triangles is by sliding down toward point O and beyond, to the portion of the boundary without the triangle, from where it is possible to reach directly every point of the configuration space.

Clearly, the property represented by the row of black triangles along a portion of the boundary of the configuration space is accomplished by the use of locking mechanism 7. Sliding along the boundary from point A to O represents rotation of foot piece 3 from position depicted in FIG. 1a to FIG. 1. It is not possible to apply brakes, that is cause rotation around pivot 2, or equivalently move to the right in the configuration space FIG. 7 when foot piece 3 is intermediate of positions of FIG. 1a and FIG. 1, that is when the system is in configurations represented by points lying on the boundary between points A and O. On the other hand, when brakes are applied, it is possible to open throttle. Then brakes can be released without closing throttle, that is it is possible to go from position of FIG. 1c directly to that of FIG. 1a, or equivalently from point C of the configuration space FIG. 7 to point A there.

Therefore the very essence of the combination control is the configuration space depicted in FIG. 7.

I claim:

1. A mechanism of at least twodimensional configuration space, with a twodimensional subspace being later referred to as a configuration subspace, comprising:
   (a) a control element, movable by external pressure, whose movements cause said mechanism to move in said configuration subspace,
   (b) locking means for introducing a line in said configuration subspace, and so arranged that said line can be crossed only in one direction, from front to rear, said line being substantially parallel to a section of the boundary of said configuration subspace, and lying in the immediate neighbourhood of said section, with its rear facing said section,
   (c) urging means for urging said mechanism to a position represented in said configuration subspace by a point O lying in the neighbourhood of one of the ends of said line, when external pressure is substantially released from said control member.

2. The mechanism of claim 1, where said locking means comprise:
   (a) a rod,
   (b) means for enabling said rod to substantially carry pressure exerted on said control element, when said mechanism is in a position represented in said configuration space by a point lying behind said line.

3. The mechanism of claim 1, wherein a surface of said control member, which is engaged by an operator is substantially flat.

4. The mechanism of claim 3, wherein said control member is foot operated.

5. The mechanism of claim 3, so arranged that the pressure applied to said surface, needed to overcome said urging means and move around said configuration subspace is substantially perpendicular to said surface.

6. The mechanism of claim 1 comprising conveying means for translating or transforming the movement of said mechanism in said configuration subspace to movements of members controlling other devices.

7. The mechanism of claim 6, wherein a surface of said control member, which is engaged by an operator is substantially flat.

8. The mechanism of claim 7, wherein said control member is foot operated.

9. The mechanism of claim 7, so arranged that the pressure applied to said surface, needed to overcome said urging means and move around said configuration subspace is substantially perpendicular to said surface.

10. A mechanism comprising:
    (a) a support member,
    (b) a control member movable by external pressure, comprising a portion (H) and a portion (T),
    (c) a pivotal connection joining said support member with said control member lying substantially between said portion (T) and said portion (H) and such that the axis of rotation of said pivotal connection is substantially perpendicular to an imaginary line joining said portion (T) and said portion (H),
    (d) guiding means for constraining the movement of said support member in such a manner, that a point of said pivotal connection sweeps a curve substantially perpendicular to said axis of rotation of said pivotal connection,
    (e) locking means for locking said support member in a relaxed position when there is no external pressure applied to said control member, said locking means retaining said support member substantially in said relaxed position when pressure is applied to said control member in such a way that said control member remains in a neutral position with respect to said support member, that is a position similar to the one, when there is no pressure applied to said control member, said locking means retaining said support member substantially in said relaxed position when said control member is pivoted on said pivotal connection away from said neutral position in a direction (T') consistent with the direction of pressure applied to said portion (T), whereby providing substantially rigid support for said pivotal connection when said support member is substantially in said relaxed position and said control member is pivoted on said pivotal connection away from said neutral position in said direction (T'), said looking means being released when said control member is pivoted on said pivotal connection away from said neutral position in a direction (H')

opposite to said direction (T') and consistent with the direction of pressure applied to said portion (H), whereby allowing said support member to move away from said relaxed position when said control member is pivoted away from said neutral position in said direction (H'), (f) urging means for urging said support member to said relaxed position and said control member to said neutral position whenever pressure is substantially released from said control member.

11. The mechanism of claim 10 wherein said locking means comprise, (a) a rod, (b) means for enabling one end of said rod to operatively communicate with said support member, so that said rod substantially carries in its substantially longitudinal direction pressure exerted on said control member when said locking means are in the locked position.

12. The mechanism of claim 10 wherein said imaginary line joining said portion (T) and said portion (H) is substantially perpendicular to said curve when said support member is in said relaxed position and said locking means are on a verge of being released as a result of pivotal movement of said control member on said pivotal connection in said direction (H').

13. The mechanism of claim 10, wherein said control member is engagable by an operator's foot.

14. The mechanism of claim 10 further including (a) first conveying means for translating or transforming the relative movement of said control member and said support member to a movement of a member controlling a first device, (b) second conveying means for translating or transforming the movement of said support member to a movement of a member controlling a second device.

15. In association with a motor driven vehicle having separate means for accelerating and braking, the mechanism of claim 14, wherein said first device is a device for controlling the acceleration of said vehicle, and said second device is a device controlling braking of said vehicle.

16. The mechanism of claim 10, wherein said locking means comprise at least one element attached to said support member.

17. The mechanism of claim 16, wherein said locking means comprise:

(a) two rods pivotally joined, with free ends of said rods pivotally connected to a stationary part and to said support member, respectively, (b) straightening means for keeping the pivotal joint between said rods in substantially straightened position when there is no external pressure applied to said control member, said straightening means keeping said pivotal joint between said rods in substantially straightened position when pressure is applied to said control member in such a way that said control member remains in said neutral position with respect to said support member, said straightening means keeping said pivotal joint between said rods in substantially straightened position when said control member is pivoted on said pivotal connection away from said neutral position in said direction (T'), (c) bending means for forcing said pivotal joint between said rods to bends, when said control member is pivoted on said pivotal connection away from said neutral position in said direction (H').

18. The mechanism of claim 17, wherein said locking means comprise:

(a) a rod terminated at one end with a roller, and the other end of said rod pivotally attached to said support member, (b) a track for said roller with a transverse portion engagable by said roller when said support member is in said relaxed position, said transverse portion being substantially perpendicular to an imaginary line connecting the pivotal connection between said rod and said support member and said roller when there is no external pressure applied to said control member, (c) holding means for keeping said roller on said transverse portion of said track when there is no external pressure applied to said control member, said holding means keeping said roller on said transverse portion of said track when pressure is applied to said control member in such a way, that said control member remains in said neutral position with respect to said support member, said holding means keeping said roller on said transverse portion of said track when said control member is pivoted on said pivotal connection away from said neutral position in said direction (T'), (d) pushing means, for pushing said roller off said transverse portion of said track when said control member is pivoted on said pivotal connection away from said neutral position in said direction (H').

19. The mechanism of claim 10, wherein said locking means comprise:

(a) two rods pivotally joined, with free ends of said rods pivotally connected to a stationary part and to said control member, respectively, (b) straightening means for keeping the pivotal joint between said rods in substantially straightened position when there is no external pressure applied to said control member, said straightening means keeping said pivotal joint between said rods in substantially straightened position when pressure is applied to said control member in such a way, that said control member remains in said neutral position with respect to said support member, said straightening means keeping said pivotal joint between said rods in substantially straightened position when said control member is pivoted on said pivotal connection away from said neutral position in said direction (T'), (c) bending means for forcing said pivotal joint between said rods to bend, when said control member is pivoted on said pivotal connection away from said neutral position in said direction (H').

20. The mechanism of claim 10, wherein said locking means comprise:

(a) a rod terminated at one end with a roller, and the other end of said rod pivotally attached to said control member, (b) a track for said roller with a transverse portion engagable by said roller when said support member is in said relaxed position, said transverse portion being substantially perpendicular to an imaginary line connecting the pivotal connection between said rod and said control member and said roller when there is no external pressure applied to said control member, (c) holding means for keeping said roller on said transverse portion of said track when there is no external pressure applied to said control member, said holding means keeping said roller on said transverse portion of said track when pressure is applied to said control member in such a way, that said control member remains in said neutral position with respect to said support member, said holding means keeping said roller on said transverse portion of said track when said control member is pivoted on said pivotal connection away from said neutral position in said direction (T'), (d) pushing means, for pushing said roller off said transverse portion of said track when said control member is pivoted on said pivotal connection away from said neutral position in said direction (H').

* * * * *